United States Patent [19]

Augustine et al.

[11] Patent Number: 5,440,633
[45] Date of Patent: Aug. 8, 1995

[54] COMMUNICATION NETWORK ACCESS METHOD AND SYSTEM

[75] Inventors: Kurt E. Augustine, Rochester, Minn.; James Edward Neeley, Sr., Chapel Hill; Norman Clark Strole, Raleigh, both of N.C.

[73] Assignee: International Business Machines Corporation, Armonk, N.Y.

[21] Appl. No.: 112,007

[22] Filed: Aug. 25, 1993

[51] Int. Cl.⁶ .............................................. H04K 1/00
[52] U.S. Cl. ......................................... 380/23; 380/25; 380/44; 340/825.07; 370/60
[58] Field of Search ........................ 380/23, 25, 43, 44; 340/825.07; 364/242.95; 370/60, 94.2

[56] References Cited

U.S. PATENT DOCUMENTS

| | | |
|---|---|---|
| 4,894,823 | 1/1990 | Adelmann et al. . |
| 4,910,777 | 3/1990 | Larson et al. .................... 380/49 |
| 5,048,087 | 9/1991 | Trbovich et al. . |
| 5,113,499 | 5/1992 | Ankney et al. . |
| 5,293,576 | 3/1994 | Mihm et al. ..................... 380/21 |
| 5,313,521 | 5/1994 | Torii et al. ...................... 380/21 |

FOREIGN PATENT DOCUMENTS

WO92/03000 2/1992 WIPO .

OTHER PUBLICATIONS

Article Entitled "Secure Communication Using Remote Procedure Calls" by Birrell, ACM Transactions on Computer Systems, vol. 3, No. 1, Feb. 1985, pp. 1-14.

Primary Examiner—David C. Cain
Attorney, Agent, or Firm—Joscelyn G. Cockburn

[57] ABSTRACT

A network management frame contains a clear text (unencrypted) management command field and a security field. The management frame is sent to a data communications network by an authorized managing entity (manager). The management frame is addressed to a managing agent (agent). The security field includes two sub fields. The first sub field is a clear text time stamp. The second sub field includes this same time stamp value concatenated with a checksum that is calculated by the manager for the specific clear text management command contained within the management frame. The concatenated value is then encrypted under a secret cryptographic key that is shared by the manager and the agent. The agent receives the management frame, calculates a checksum of the clear text management command, and appends this checksum to the clear text time stamp as contained in the received management frame. This value is then encrypted using the shared cryptographic code. If the result matches the second sub field of the received management command, integrity of the received management command is assured. Next, the clear text value of time stamp contained within the received management command is checked against a common clock within the agent. If the value of this time stamp falls within an predetermined time window, the authenticity of the received management command has been verified.

22 Claims, 5 Drawing Sheets

COMMUNICATION NETWORK ACCESS METHOD AND SYSTEM

BACKGROUND OF THE INVENTION

1. Field of the Invention

This invention pertains to the field of data communications networks and, more specifically, to means for determining the integrity and the authenticity of command frames, management frames, and the like, that are issued from a network node by an authorized managing entity or network manager.

2. Description of the Prior Art

As computer systems become geographically distributed, availability of the computer network becomes a major concern to all network customers. For example, disruption of a single network device can cause a tremendous loss in productivity by the network's customers. Network devices, such as concentrators, bridges, routers, gateways and servers, are increasingly being managed from remote network stations via network command fields that are contained in network management frames. Authenticity of the origin of management frames and the integrity of the management frames themselves are critical to maintaining high availability of the network. One unauthorized network command has the potential to disrupt thousands of network users and cause an unacceptable degradation in network performance or, in the worst case, prevent access to some, or all, network services including, for example, server and host access. An unauthorized management frame can be issued accidentally or maliciously. Thus, in all cases, it is desirable to check the integrity and authenticity of the network command frames.

The prior art describes various means for determining the integrity and authenticity of requests or commands that are issued from a network node by a network user.

The article entitled "Secure Communication Using Remote Procedure Calls, *ACM Transactions On Computer Systems*, Vol. 3, No. 1, Feb. 1985, pages 1-14, describes an end-to-end secure protocol. An authenticator is based upon the time at which the authenticator was formed. This is done in order to limit the lifetime of an authenticator to a few hours.

The use of time stamping in a packet network is known. U.S. Pat. No. 4,894,823 is exemplary.

U.S. Pat. No. 5,113,499, incorporated herein by reference for the purpose of indicating the background of the invention and as illustrative of the state of the art, describes a telecommunications access management system having authorization, validation and password features.

U.S. Pat. No. 5,048,087, incorporated herein by reference for the purpose of indicating the background of the invention and as illustrative of the state of the art, describes end-to-end encryption for a packet based network and, more specifically, a means for the changing keys that are used for encryption.

The PCT publication International Publication Number WO 92/03000 describes a system for tamper proof time stamping a digital document to protect secrecy and which includes cryptographic verification.

While the prior art, of which the above is exemplary, is generally useful for its limited intended purposes, the need remains for a communications network access system providing improved means for checking the integrity and authenticity of received network management command frames.

SUMMARY OF THE INVENTION

The present invention provides a communications network access system having an improved construction and arrangement for checking the integrity and the authenticity of network management, or action commands that are received by the network from the various users of the network. More specifically, a command to the network, in accordance with the invention, comprises a network management frame that contains a clear text (unencrypted) management command field and a security field. The management frame is sent to the network by an authorized managing entity (called a network manager). The management frame is addressed to a managing station or agent.

The management frame's security field includes two sub fields. The first sub field comprises a clear text time stamp. The second sub field includes this same time stamp value concatenated with a checksum that is calculated for the specific clear text management command that is contained within the management frame. A common checksum algorithm that is shared by all network managers and all agents is used to calculate this checksum. The concatenation of the time stamp and checksum is encrypted under a common cryptographic key that is shared by all network managers and agents.

An agent receives the management frame from the network, calculates a checksum of the clear text management command using the common checksum algorithm, and appends this checksum to the clear text time stamp that is contained in the received management frame. This concatenation is then encrypted using the common cryptographic code or key. If the result matches the second sub field of the received management frame, the integrity of the received management command has been verified.

Next, the clear text time value of the time stamp that is contained within the received management frame is checked. If the time value of this time stamp falls within a predetermined time window, authenticity of the received management frame has been verified.

In the description of the invention, it will be assumed that all network devices utilize well-known means to synchronize their respective time of day clocks, and thereby facilitate the accuracy of the time stamp that is included in the security field of each management frame in accordance with the invention. In addition, it will be assumed that all network devices utilize well-known means to distribute the common encryption code and checksum algorithm for performing the common sender/receiver encryption and common sender/receiver checksum calculation in accordance with the invention.

An object of the invention is to manage access to a communications network by issuing a management frame to the network, the management frame containing a clear text management command and a security field, and the security field comprising two sub fields, one of which is a clear text time stamp, and the other of which is an encryption of a function of the time stamp and the management command, this function then being encrypted using a common cryptographic key. This management frame is then received from the network. An encrypted function of the received time stamp and the received management command is now formed using the common cryptographic key. If the result of this encryption matches the second sub field of the received management frame, the integrity of the received management frame has been verified. If the time stamp contained in the received management frame falls within a predetermined time window, authenticity of the received management frame has been verified.

A further object of the invention is to manage a data network by the use of action commands, wherein an issuing entity calculates a checksum from a desired action command using a common algorithm, and establishes a time stamp of issuing the action command to the network. A concatenation of the desired action command and the time stamp is encrypted using a given encryption code. An action frame is now issued to the network, the action frame containing a clear text of the action command and a two-part security field, one part of which is a clear text of the time stamp, and the other of which is the encryption. When this action frame is received from the network, the above-described concatenation and encryption is repeated. If the result of this repeat encryption matches the corresponding part of the two-part security field in the received action frame, the integrity of the received action frame has been verified. If the time stamp contained in the received action frame falls within a predetermined time window, authenticity of the received action frame has been verified.

These and other objects and advantages of the invention will be apparent to those of skill in the art upon reference to the following detailed description of the invention, which description makes reference to the drawing.

DESCRIPTION OF THE PREFERRED EMBODIMENT

Figure 1:
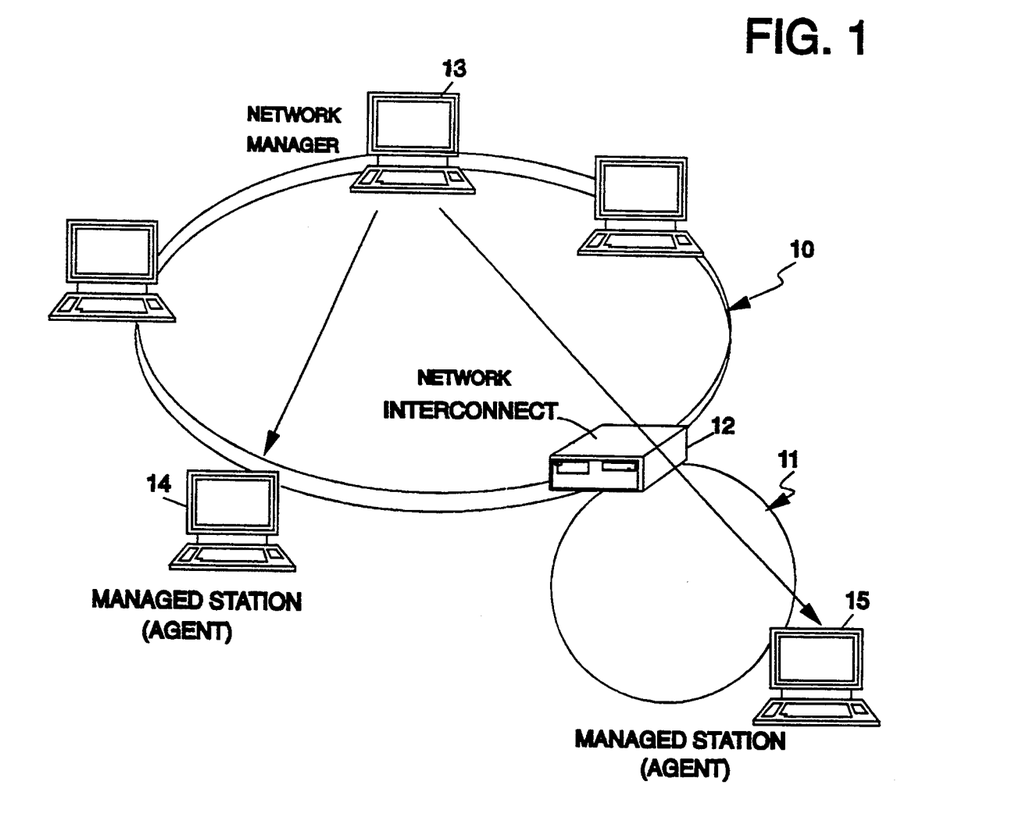
FIG. 1 shows a data communication network having management control in accordance with the invention.

As stated, the present invention provides a communications network access system having improved construction and arrangement for checking the integrity and the authenticity of network management or action frames that are received by the network from the various users of the network. FIG. 1 shows a data communication network system having management control in accordance with the invention, the network system comprising two networks 10 and 11 that are interconnected by the use of a network interconnect means 12. The function of managing remote devices in networks 10,11 requires communication between network manager 13, also known as a managing entity, and managed stations 14,15, also known as managed agents. This management communication between manager 13 and stations 14,15 is typically carried out using well-known management protocol, such as Common Management Information Protocol (CMIP) or Simple Network Management Protocol (SNMP). Manager 13 issues commands by sending special data frames, called management frames, to stations 14,15 over networks 10,11.

Generally, network management and control, in accordance with the invention, is independent of the type or configuration of the network. Exemplary control methods are Retrieve Agent Information (GET's), Change Agent Values (SETs) and Request Actions to be Performed by the Agent (ACTIONs). As is known, ACTION and SET commands can result in the loss of customer access to one or more critical network elements. For example, an ACTION command may result in a network reconfiguration or the removal of a major server, or gateway, node from the network. In order to eliminate unwanted network disruptions, management frames need to be sent unaltered by an authorized manager to a specified agent; for example, to an FDDI concentrator.

In order to manage a network system, such as is shown in FIG. 1, management frames have included a security field, also called an access control field. Many times this field contains only a password. However, it is relatively easy for another station on the network to capture a passing management frame and then steal the password, thereafter enabling this station to masquerade as a network manager. Other security techniques that are not foolproof include the registration of a protocol between the network manager and the network agents, and the use of encryption techniques having secret keys.

The present invention provides a security field for communicating network commands from manager 13 to agents 14,15 wherein a time stamp is used in computing a sub field, with the result that no two security fields are ever the same. The time stamp, in fact, serves two purposes. First, it is used in combination with the specific network command to generate the unique above-mentioned sub field. Second, timeliness of the time stamp is verified by the receiving station 14,15 to determine if the command is, in fact, timely.

Figure 2:
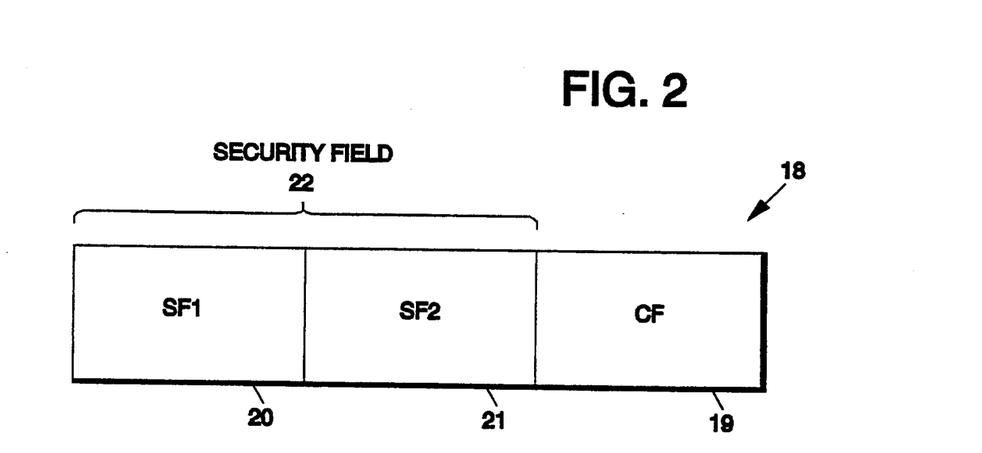
FIG. 2 shows a three-part network management frame in accordance with the invention, this management frame being sent by the network manager of FIG. 1 to one or more of the managed stations shown in FIG. 1.

In accordance with the invention, the communications network of FIG. 1 is managed by network manager 13 issuing a management frame to one or more managed stations 14,15 within the network. FIG. 2 shows a management frame 18 in accordance with the invention. Management frame 18 comprises three parts: A command frame 19 (CF), a first sub field 20 (SF1), and a second sub field 21 (SF2). SF1 and SF2 comprise the security field 22 of management frame 18. As will be apparent, SF1 and SF2 are established by network manager 13, and this security field is based upon (1) the type of control action that is defined by CF 19, (2) a clock that is common to network manager 13 and managed stations 14,15 (common clock), (3) an encryption that is based upon an encryption code or key that is common to network manager 13 and managed stations 14,15 (common encryption code), and (4) a checksum that is calculated using a checksum algorithm that is common to network manager 13 and managed stations 14,15 (common checksum algorithm).

Figure 3:
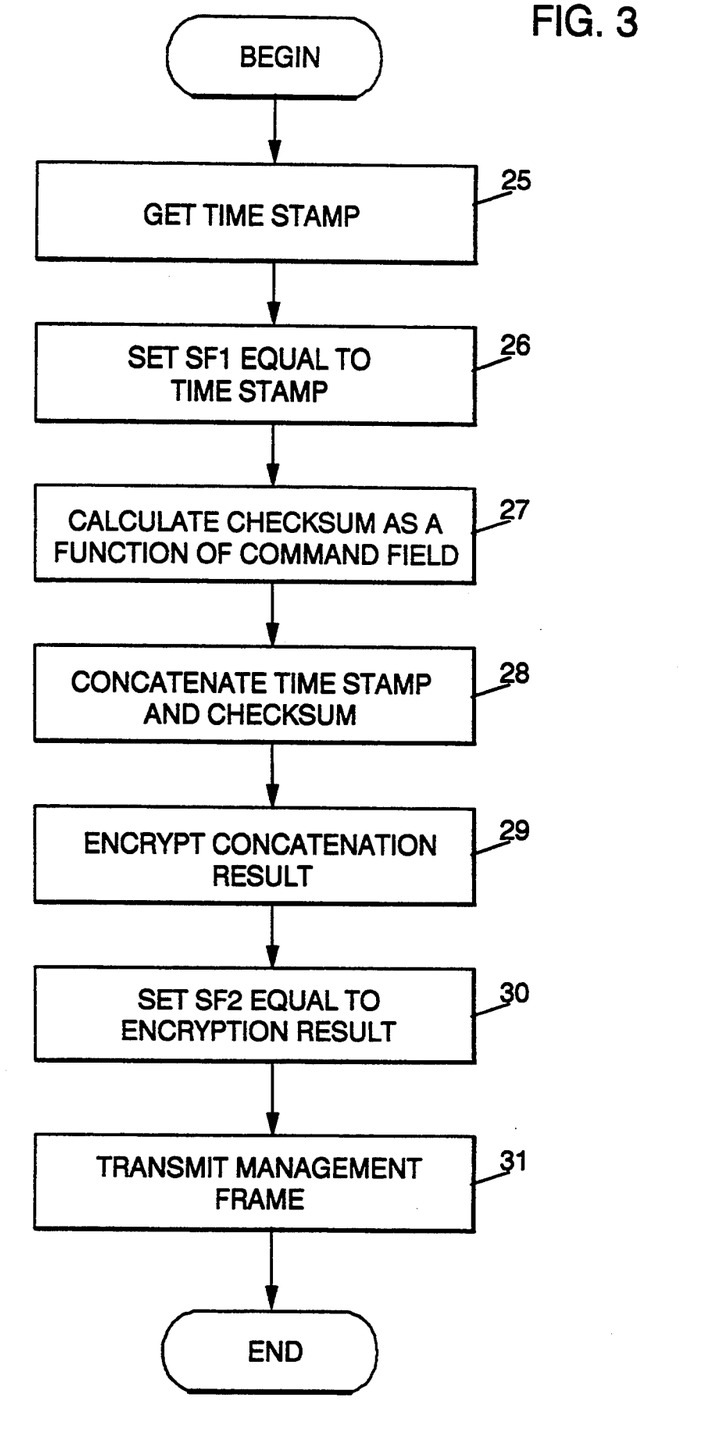
FIG. 3 shows how the management frame of FIG. 2 is formed by the network manager.

FIG. 3 shows how management frame 18 of FIG. 2 is formed by network manager 13. The effect of management frame 18 will be to implement the specific network control action (for example, an ACTION or SET command) that is defined by the control field (CF) that has been selected by network manager 13 from a library, or list, of such control actions.

Figure 5:
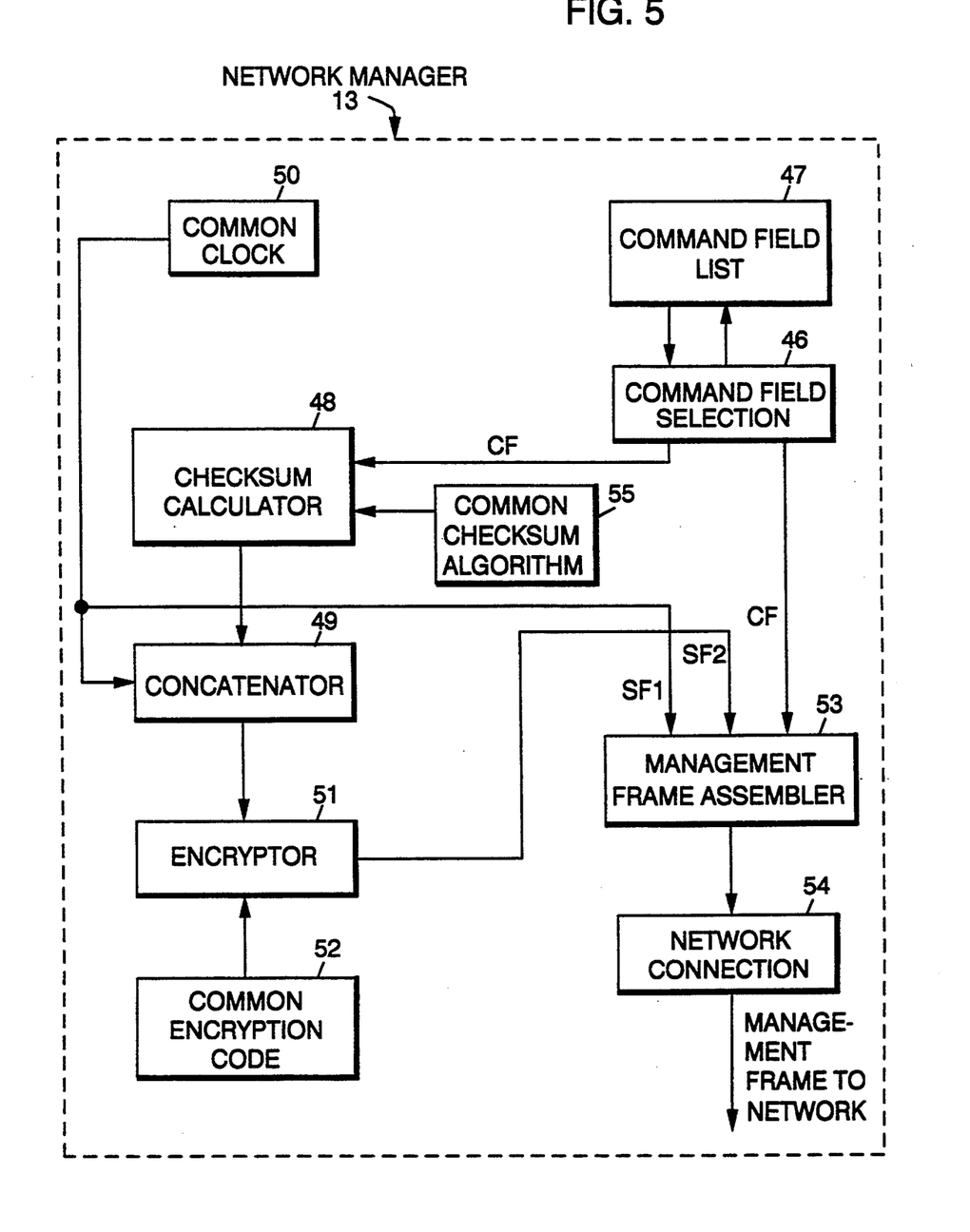
FIG. 5 shows the hardware portions of the network manager that operate to perform the functions of FIG. 3.

FIG. 3 is shown in the form of a logic flowchart. As such, FIG. 3 can be implemented by the use of a software controlled processor, or by way of discrete logic members, as is shown in FIG. 5. As will be apparent, network manager 13 contains a clock whose time is common to network manager 13 and to managed stations 14,15. It is important to network management that this common clock be distributed to network manager 13 and managed stations 14,15. However, the specific details of how this is done are well known, and are not critical to the invention.

As shown at function block 25, a time stamp is formed using the network manager's current time as provided by this clock. Sub field 20 (SF1) of FIG. 2 is now set to be equal to this time stamp, as is shown at block 26. Next, block 27 operates to calculate a checksum as a function of the selected command frame 19 using a common checksum algorithm. The time stamp and the checksum are now concatenated as shown at block 28. The concatenation result is then encrypted at block 29, using an encryption code, or key, that is common to network manager 13 and to managed stations 14,15. It is important to the security of network management that this encryption key be distributed to network manager 13 and managed stations 14,15 in a secure manner. The details as to how this is done are well known, and are not critical to the invention.

The results of this encryption of the concatenation result enables network manager 13 to set sub field 21 (SF2) of management frame 18 equal to the encryption results, as shown at function block 30.

Management frame 18 has now been formed by network manager 13 and, as shown at block 31, this management frame is sent to the network shown in FIG. 1. This management frame contains a clear text management command, or field, 19 and a security field 22. The security field comprises two sub fields 20 and 21, 20 of which is a clear text time stamp, and 21 of which is an encryption of a function of the time stamp and the management field, this function being encrypted using a common cryptographic key.

More specifically, the first sub field SF1 of this management frame contains a clear text (i.e., unencrypted) time stamp that is unique and is synchronized with all communicating network managers 13 and all agents or managed stations 14,15 in the network. The second sub field SF2 includes this same time stamp value concatenated with a checksum that is based off of the command field, CF, that contains the actual network management command, all of which are encrypted under a secret cryptographic key that is shared between the network managers 13 and agents 14,15. For example, SF1 could contain "199303172100", representing a time stamp of Mar. 17, 1993 at 9:00PM. SF2 could then contain "E(199303172100+C(ACTION:DISA-BLE_LOBE_X))," where E(x) is the encrypted version of x and C(y) is the checksum of y. It is important to note that the invention does not restrict those skilled in the art relative to a particular method for achieving clock synchronization, a particular checksum algorithm or method of distributing the checksum algorithm, or a particular encryption key or method of distribution the encryption key.

Figure 4:
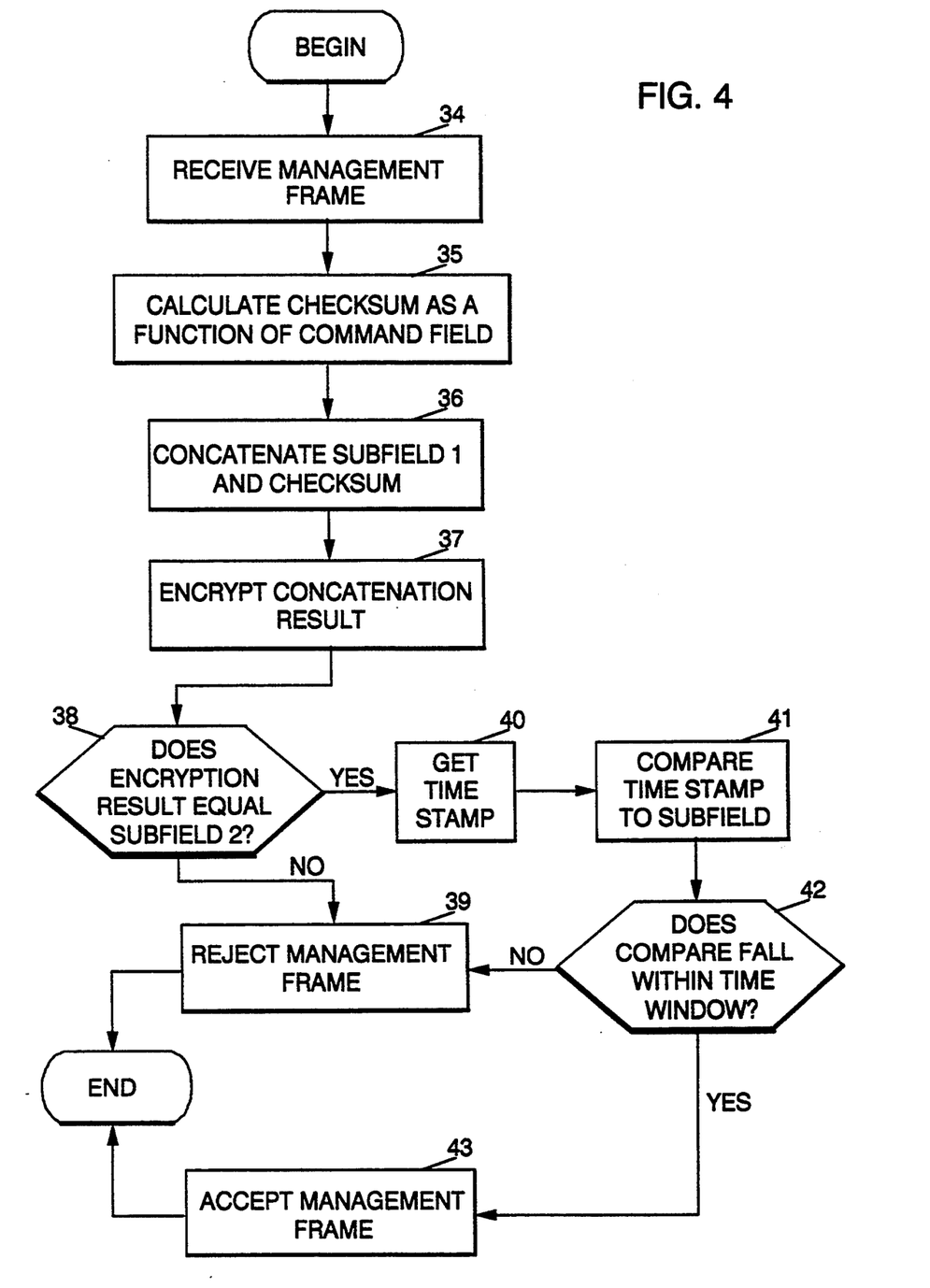
FIG. 4 shows how the managed stations operate to check both the integrity and the authenticity of the management frame shown in FIG. 2.

FIG. 4 shows a compare process in accordance with the invention whereby the addressed one of managed stations 14,15 operates to check both the integrity and the authenticity of the management frame shown in FIG. 2, this exemplary management frame containing SF1="199303172100", SF2="E(199303172100+C(ACTION:DISABLE_LOBE_X))," and CF="ACTION:DISABLE LOBE X". Upon receipt of this management frame, the addressed managed station does not carry out the specified management command CF until it has determined whether or not the management frame is legitimate.

Reception of the management frame from the network is indicated in FIG. 4 by function block 34. The received command field CF within the received management frame is now used to calculate a checksum using the common checksum algorithm, as is shown at block 35. This checksum is concatenated with SF1 (the network manager's time stamp) at block 36, and the concatenation result is encrypted using the common encryption key, as shown at 37.

Decision block 38 now compares the results of concatenation block 37 to the content of SF2, as contained in the received management frame 18. If comparison 38 is not favorable, function block 39 is enabled, and the received management frame is rejected by the managed station. If, however, the comparison is favorable (i.e., if the encryption result of block 37 is identical to, or substantially identical to, SF2 of the received management frame), then block 40 is enabled to fetch the value of the common clock at the managed station.

The value of this clock is substantially equal to the time at which the received management frame was received from the network. This clock value is now compared to SF1 of the received management frame, as shown at block 41. Decision block 42 now determines if the result of compare 41 is favorable; for example, does the time difference between (1) the time value of SF1 in the received management frame, and (2) the value of the common clock at the managed station at the time at which the management frame was received from the network, fall within an acceptable time window?

The time window is set according to several criteria. First, the amount of time required for the management frame to travel through the network from the manager to the agent. This time may be milliseconds, for a local area network, or it may be seconds (or even minutes) for a long line or satellite network. A second factor in setting the time window is the time for capture and retransmission of the management frame by an non-manager sender. Such a retransmission could be used to sabotage the network. For example, a command to take a link, or a node, of the network down for maintenance could be captured and retransmitted later. If this were done after the maintenance work had been finished, it would cause a network failure. A third factor could be the time required to decrypt the management frame and then send an illegal command that would appear to be legal. The time required for such an act is at least several hours. Accordingly, because of the first and second factors, the time window is preferably set a few seconds longer than the transmission time through the network. One skilled in the art will appreciate that the time window may be selected from a large range of time settings depending on the three factors discussed above.

There is also another variation on the use of the time window. If the transmission time for the management frame is known, then the manager might send a clear text time stamp that is the sum of the time of departure from the manager and the transmission time. In effect, the transmitted message frame would carry a time stamp corresponding to the arrival time at the agent. In this embodiment, the time window would not include a factor for transmission time. The time window would preferably be set near zero, or possibly a few seconds (for example, less than 10 seconds), to prevent illegal message frames due to capture and retransmission.

However the time window is set and used, if the output of decision block 42 is not favorable, function block 39 is enabled, and the received management frame is rejected by the managed station. If, however, the output of decision block 42 is favorable, then block 40 is enabled to allow the managed station to receive and act on the information content of the received management frame; for example, the action command "ACTION:DISABLE_LOBE_X" is executed.

FIG. 5 shows hardware portions of network manager 14 that operate to perform the invention, as shown in FIG. 3. As an initial step, command field selector 46 operates to select a user-defined command field CF from a list or library 47 of all possible network commands. The selected CF is then transmitted to checksum calculator 48, whereat a checksum of the selected CF is calculated using a common checksum algorithm that is stored at 55; i.e., a checksum algorithm that is common to all network managers and all network managed stations. The checksum output result is now transmitted to concatenator 49 whereat the checksum result is concatenated with the current time of common clock 50. The concatenator's output is then transmitted to encryptor 51 operating under a common encryption code that is stored at 52.

Management frame assembler 53 now operates to assemble the current time output SF1 of common clock 50, the encryption output SF2 of encryptor 51, and the CF output of command field selector 46 into management frame 18, as shown in FIG. 2. Network connection 54 then issues management frame 18 to the network of FIG. 1.

Figure 6:
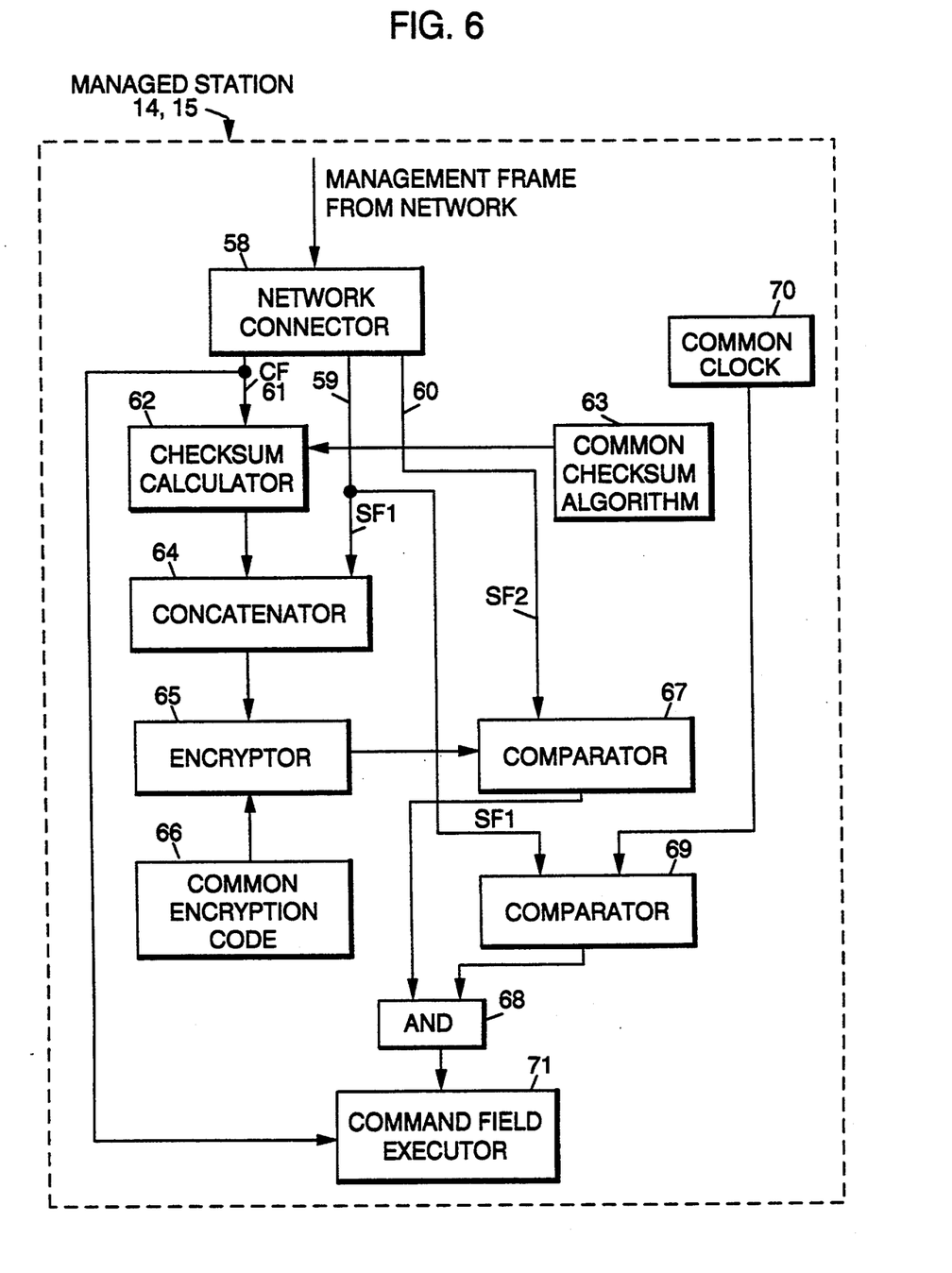
FIG. 6 shows the hardware portions of the managed stations that operate to perform the functions of FIG. 4.

FIG. 6 shows hardware portions of managed stations 14,15 that operate to perform the functions shown in FIG. 4. The management frame 18, that is transmitted from network manager 13 of FIG. 5, is received by network connector 58, thus the output of connector 58 comprises SF1 at conductor 59, SF2 at conductor 60, and CF at conductor 61.

Checksum calculator 62 operates upon the CF field of the received management frame to calculate a checksum therefrom, using the common checksum algorithm that is stored at 63. Concatenator 64 now operates to concatenate the output of checksum calculator 62 and the SF1 field of the received management frame. The concatenated output of concatenator 64 is then encrypted by encryptor 65 using the common encryption code that is stored at 66.

The output of encryptor 65 is compared to the SF2 field of the received management frame by operation of comparator 67. If the output of encryptor 65 is identical to the SF2 field of the received management frame, then one enable input is provided to AND gate 68.

A second comparator 69 operates to compare the SF1 field of the received management frame with the current time of the common clock 70 that is contained in each of the managed stations 14,15. If the difference between the time stamp contained in SF1 of the received management frame and the time of common clock 70 falls within a predefined time window, then a second enable input is provided to AND 68, and the command function CF contained within the received management frame is executed by member 71. Thus, it can be seen that should either of the compare functions 67 or 69 fail to achieve a favorable compare, the command function CF, contained within the received management frame, will not be executed.

From the above description of preferred embodiments of the invention, it will be appreciated that a method and an apparatus has been provided for managing the network of FIG. 1 wherein a management frame 18 is issued to the network, the management frame containing a clear text management command 19 and a security field 22 that comprises two sub fields 20 and 21, 20 of which is a clear text time stamp, and 21 which is an encryption of a function of time stamp 20 and management command 19, this function being encrypted using a common cryptographic key 52,66. This management frame 18 is received from the network by a managed station 14,15. The time stamp 20 and the management command 19, as contained in the received management frame 18, are then encrypted using the common encryption keys 52,66. If the result of this encryption matches sub field 21 of the received management frame, one parameter of the transmission has been checked. As a second check, the common clock 70 of the managed station is check against sub field 20 of the received management frame, to determine if this comparison falls within an predetermined time window.

It is appreciated that those skilled in the art will readily visualize yet other embodiments of the invention that are within the spirit and scope of the invention. Thus, the above detailed description of embodiments of the invention is not to be taken as a limitation on the spirit and scope of the invention.

What is claimed is:

1. In a communication network, a method for managing the network comprising the steps of;

A—issuing a management frame to said network, said management frame containing a network management command and a security field, said security field comprising two sub fields, one of which is a time stamp of recent origin, and the other of which is an encryption of a function that is based upon said time stamp and said management command, said function being encrypted using a cryptographic key,     B—receiving said management frame from said network,     C—reading said management command and said time stamp as contained in said received management frame,     D—encrypting said function that is based upon said time stamp and said management command as contained in said received management frame using said cryptographic key, and     E—determining if the result of encrypting step D corresponds to said second sub field in said received management frame.

2. The method of claim 1 including the step of;

F—executing said management command when step E determines that the result of encrypting step D corresponds to said second sub field in said received management frame.

3. The method of claim 2 including the step of;

G—determining if said time stamp in said received management frame is of recent origin, and wherein step F executes said management command when step E determines that the result of encrypting step D corresponds to said second sub field in said received management frame, and step G determines that said time stamp in said received management frame is of recent origin.

4. The method of claim 3 wherein said step F determines if said time stamp in said received management frame falls within a time window that is determined by the time of execution of step B.

5. The method of claim 4 wherein said management command is unencrypted, and wherein said time stamp is unencrypted.

6. A method for managing a data network by the use of action frames, comprising the steps of;
   A—picking an action command to be issued to the network,
   B—calculating a checksum from said action command using a given checksum algorithm,
   C—determining that said action command is to be issued to the network and establishing a time stamp of that event,
   D—concatenating said time stamp and said checksum,
   E—encrypting the concatenation of step D using a given encryption means,
   F—issuing an action frame to said network, said action frame containing a clear text of said action command and a two part security field, one part of which is a clear text of said time stamp, and the other of which is the encryption of step E,
   G—receiving said action frame from said network,
   H—calculating a checksum from said clear text of said action command using said given checksum algorithm,
   I—concatenating the checksum of step H and the clear text time stamp contained in said received action frame,
   J—encrypting the concatenation of step I using said given encryption means, and
   K—determining if the result of step J corresponds to said other part of said two part security field in said received action frame.

7. The method of claim 6 including the step of;
   L—executing said action command only when a correspondence is found in step K.

8. The method of claim 7 including the step of;
   M—determining if said time stamp contained in said received action frame is of recent origin, and wherein
step L comprises executing said action command only when a correspondence is found in step K, and it is determined in step M that said received action frame is of recent origin.

9. The method of claim 8 wherein step L determines if said time stamp contained in said received action frame falls within an acceptable time window.

10. The method of claim 9 including the step of;
    N—establishing said time window as a function of the time at which step G is performed.

11. In an information transfer network having a plurality of stations that are operable to communicate with each other over said network, communication apparatus for the secure transmission of a data frame to said network by one station and the reception of said data frame from said network by a another station, said apparatus comprising;
    a common clock and common encryption means at each of said stations,
    first means at said one station operable to form said data frame as a first data field comprising information to be transmitted to said another station, a second data field comprising a common clock value at said one station at the time of said transmission, and a third data field comprising an encryption of a function that is dependent upon said first and second data fields, said encryption being performed using said common encryption means,
    second means at said one station operable to transmit said formed data frame to said network,
    third means at said another station operable to receive said data frame from said network,
    fourth means at said another station operable to encrypt said first and second data fields of said received data frame using said common encryption means, and
    fifth means at said another station operable to compare said encryption of said first and second fields of said received data frame to said third data field of said received data frame.

12. The apparatus of claim 11 including;
    sixth means at said another station responsive to said fifth means and operable to accept said received data frame when said encryption of said first and second fields of said received data frame corresponds to said third field of said received data frame.

13. The apparatus of claim 12 including;
    seventh means at said another station operable to compare said first data field of said received data frame with the value of said common clock at said another station at the time said received data frame is received from said network, and wherein
    said sixth means at said another station is responsive to said fifth means and to said seventh means, and said sixth means operating to accept said received data frame when said encryption of said first and second fields of said received data frame corresponds to said third field of said received data frame, and when said comparison of said common clock at said another station at the time said received data frame is received from said network indicates that said data frame is of recent origin.

14. The apparatus of claim 13 including;
    eighth means responsive to said seventh means and operable to accept said received data frame only when said common clock at said another station at the time said received data frame is received from said network substantially corresponds to the first data field of said received data frame.

15. The apparatus of claim 11 having a common checksum algorithm at each of said stations, and wherein said function that is dependent upon said first and second data fields comprises a checksum of a concatenation of said first and second data fields, said checksum being calculated using said common checksum algorithm.

16. The apparatus of claim 15 including;
    sixth means at said another station responsive to said fifth means and operable to accept said received data frame when said encryption of said first and second fields of said received data frame corresponds to said third field of said received data frame.

17. The apparatus of claim 16 including;
    seventh means at said another station operable to compare said second data field of said received data frame with the value of said common clock at said another station at the time said received data frame is received from said network, and wherein said sixth means at said another station is responsive to said fifth means and to said seventh means, and said sixth means operating to accept said received data frame when said encryption of said first and second fields of said received data frame corresponds to said third field of said received data frame, and when said comparison of said common clock at said another station at the time said received data frame is received from said network indicates that said data frame is of recent origin.

18. The apparatus of claim 17 including;
eighth means responsive to said seventh means and operable to accept said received data frame only when said common clock at said another station at the time said received data frame is received from said network substantially corresponds to the first data field of said received data frame.

19. For use in an information transfer network having a plurality of stations that communicate with one another over said network, said communication comprising the transmission of a data frame to said network by one station and the reception of said data frame from said network by a receiving station, a method for verifying a data frame comprising the steps of;
providing a common clock and common encryption means at each of said stations,
providing first means at said one station operable to form said data frame as a first data field comprising information to be transmitted to said receiving station, a second data field comprising said common clock value at said one station at the time of said transmission, and a third data field comprising an encryption of a function that is dependent upon said first and second data fields, said encryption being performed using said common encryption means,
providing second means at said one station operable to transmit said formed data frame to said network,
providing third means at said receiving station operable to receive said formed data frame from said network,
providing fourth means at said receiving station operable to encrypt said first and second data fields of said received data frame using said common encryption means, and
providing fifth means at said receiving station operable to compare said encryption of said first and second fields of said received data frame to said third data field of said received data frame.

20. The method of claim 19 including the step of;
providing sixth means at said receiving station responsive to said fifth means and operable to accept said received data frame when said encryption of said first and second fields of said received data frame is substantially identical to said third field of said received data frame.

21. The method of claim 20 including the step of;
providing seventh means at said receiving station operable to compare said first data field of said received data frame with the value of said common clock at said receiving station at the time said received data frame is received from said network, and wherein said sixth means is responsive to said fifth means and to said seventh means and is operable to accept said received data frame when said encryption of said first and second fields of said received data frame is substantially identical to said third field of said received data frame, and when said first data field of said received data frame generally compares with the value of said common clock at said receiving station at the time said received data frame is received from said network.

22. The method of claim 21 including the step of;
providing a common checksum algorithm at each of said stations, and wherein said function that is dependent upon said first and second data fields is a checksum of a concatenation of said first and second data fields, said checksum being calculated using said common checksum algorithm.

* * * * *